(12) United States Patent
Tan et al.

(10) Patent No.: US 12,196,151 B2
(45) Date of Patent: Jan. 14, 2025

(54) CONTROL METHOD FOR COMBUSTION SYSTEM, COMBUSTION SYSTEM AND ENGINE

(71) Applicant: WEICHAI POWER CO., LTD., Shandong (CN)

(72) Inventors: Xuguang Tan, Shandong (CN); Bin Pang, Shandong (CN); Dehui Tong, Shandong (CN); Peng Zhou, Shandong (CN); Xiaoxin Liu, Shandong (CN); Yuncheng Gu, Shandong (CN); Xu Cheng, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 0 days.

(21) Appl. No.: 18/560,688

(22) PCT Filed: Jan. 21, 2022

(86) PCT No.: PCT/CN2022/073115
§ 371 (c)(1),
(2) Date: Nov. 14, 2023

(87) PCT Pub. No.: WO2022/262275
PCT Pub. Date: Dec. 22, 2022

(65) Prior Publication Data
US 2024/0254939 A1     Aug. 1, 2024

(30) Foreign Application Priority Data
Jun. 17, 2021   (CN) .......................... 202110669898.1

(51) Int. Cl.
*F02D 41/40*     (2006.01)
*F02D 41/38*     (2006.01)

(52) U.S. Cl.
CPC ...... *F02D 41/402* (2013.01); *F02D 2041/389* (2013.01)

(58) Field of Classification Search
CPC .............. F02B 23/02; F02B 23/064551; F02B 23/0669; F02B 23/0672; F02B 3/06;
(Continued)

(56) References Cited

U.S. PATENT DOCUMENTS 11,181,069 B2 * 11/2021 Matsubara .......... F02B 23/0678
2010/0258077 A1   10/2010 Asai et al.
(Continued)

FOREIGN PATENT DOCUMENTS

CN        1587660 A       3/2005
CN      101446225 A       6/2009
(Continued)

OTHER PUBLICATIONS

International Search Report for PCT/CN2022/073115 mailed Apr. 26, 2022, ISA/CN.
(Continued)

*Primary Examiner* — Logan M Kraft
*Assistant Examiner* — Johnny H Hoang
(74) *Attorney, Agent, or Firm* — Yue (Robert) Xu; Apex Attorneys at Law, LLP

(57) ABSTRACT

A control method for the combustion system comprises: a fuel injector conducts first primary spray and second primary spray at intervals, and the fuel injector injects fuel to a first arc ridge during the first primary spray; and the fuel injector sprays fuel to a second arc ridge during the second primary spray. By adopting a combustion chamber having two arc ridges and respectively injecting fuel to the two arc ridges by means of the fuel injector, it can be ensured that the amount of fuel shared by each arc ridge is reduced, gathering the fuel at a single arc ridge can be avoided, and
(Continued)

it is beneficial to exert the improvement effect of the arc ridge on a wall impact jet flow velocity field at the tail end of a fuel beam, such that the fuel and gas distribution in a cylinder is facilitated.

11 Claims, 1 Drawing Sheet

(58) Field of Classification Search
CPC ......... F02D 41/401–403; F02D 41/405; F02D 41/3035; F02D 2200/101; F02D 2200/021; F02D 2200/0406; F02D 2250/38; F02D 2041/389; F02D 35/023; F02D 35/025; F02D 2200/0602; Y02T 10/12; Y02T 10/40
See application file for complete search history.

(56) References Cited

U.S. PATENT DOCUMENTS

| | | | |
|---|---|---|---|
| 2014/0305402 A1* | 10/2014 | Zoeller | F02B 23/0693 123/294 |
| 2018/0100466 A1 | 4/2018 | Bowditch et al. | |
| 2018/0340488 A1 | 11/2018 | Fukuda et al. | |
| 2019/0153976 A1 | 5/2019 | Díaz-Blanco et al. | |
| 2020/0240351 A1 | 7/2020 | Shirahashi et al. | |
| 2021/0231076 A1* | 7/2021 | Matsumoto | F02B 31/085 |
| 2021/0239068 A1* | 8/2021 | Matsumoto | F02D 41/401 |
| 2024/0117780 A1* | 4/2024 | Tan | F02D 35/023 |

FOREIGN PATENT DOCUMENTS

| | | | |
|---|---|---|---|
| CN | 105134370 | A | 12/2015 |
| CN | 113123892 | A | 7/2021 |
| EP | 1264973 | A2 | 12/2002 |
| EP | 1630380 | A1 | 3/2006 |
| JP | 2002276374 | A | 9/2002 |
| JP | 2002364367 | A | 12/2002 |
| JP | 2004190572 | A | 7/2004 |
| JP | 2004190573 | A | 7/2004 |
| JP | 2006283690 | A | 10/2006 |
| JP | 2008121429 | A | 5/2008 |
| JP | 2020122411 | A | 8/2020 |
| SU | 1657689 | A1 | 6/1991 |

OTHER PUBLICATIONS

The Japanese 1st Office Action issued on Sep. 3, 2024 for JP2023-557809.

The Russian 1st Office Action issued on Jul. 18, 2024 for RU2023130093.

* cited by examiner

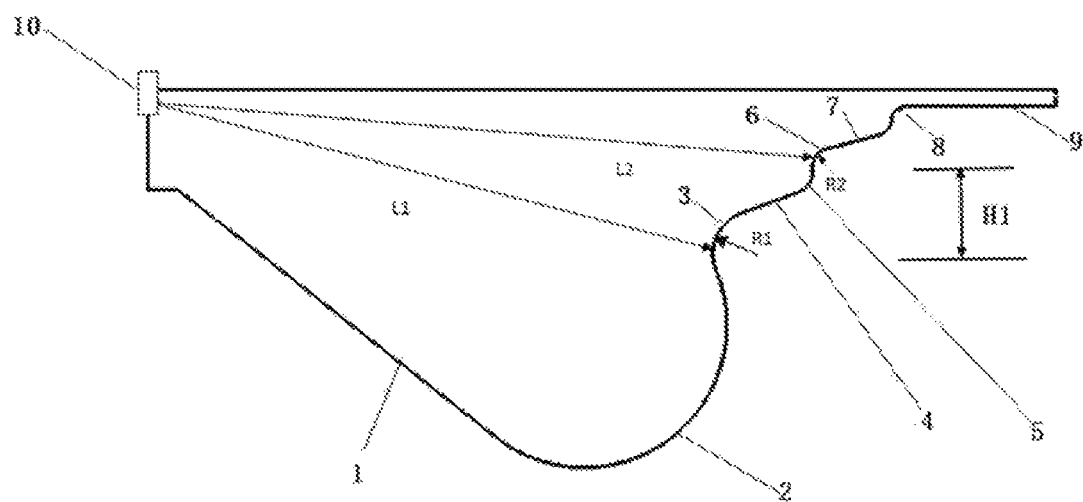

CONTROL METHOD FOR COMBUSTION SYSTEM, COMBUSTION SYSTEM AND ENGINE

The present application is a National Phase entry of PCT Application No. PCT/CN2022/073115, filed on Jan. 21, 2022, which claims priority to Chinese Patent Application No. 202110669898.1, titled "CONTROL METHOD FOR COMBUSTION SYSTEM, COMBUSTION SYSTEM AND ENGINE", filed on Jun. 17, 2021 with the China National Intellectual Property Administration, which are incorporated herein by reference their entireties.

FIELD

The present application relates to the technical field of engines, and in particular to a method for controlling a combustion system, the combustion system and an engine.

BACKGROUND

The main combustion method of a diesel engine in the conventional technology is diffusion combustion, and the combustion speed is largely limited by the oil-gas mixing speed. Further, a high-pressure common rail diesel engine generally uses a single main fuel injection. The entrainment effect of single high-pressure injection mainly occurs in the atomization area, the entrainment effect is weakened in the middle of a fuel beam, and the oil-gas mixing effect is poor. Most of combustion chambers matched with one main injection use a single-step arc ridge structure, and the amount of fuel distributed at the end of the oil beam is relatively large, and, the accumulation of the fuel at an arc ridge is especially large, so that the velocity field of a jet hitting the wall at the end of the oil beam cannot be effectively improved by the arc ridge. Since the diesel engine has a high rotation speed, and the time for controlling oil-gas mixing is very short for the four-stroke diesel engine, jets and droplets produced by a single injection are difficult to be timely diffused in the combustion chamber to form a uniform mixture with air after being broken and atomized, thereby limiting a rapid combustion process and further limiting a power output of the diesel engine.

SUMMARY

The purpose of the present application is to provide a method for controlling a combustion system, the combustion system, and an engine, so as to solve the problem that the combustion system in the conventional technology is not conducive to sufficient oil-gas mixing because the combustion system usually adopts a single main injection.

In one aspect, the method for controlling the combustion system is provided according to the present application. The combustion system includes a piston, a cylinder, and a fuel injector. The piston is slidably arranged in a cylinder chamber of the cylinder. A combustion chamber communicated to the cylinder chamber is provided on top of the piston. A side wall of the combustion chamber is formed with a first arc ridge and a second arc ridge that are spaced apart from each other, and the first arc ridge and the second arc ridge protrude into the combustion chamber. The method for controlling a combustion system includes: the fuel injector is configured to perform a first main injection and a second main injection at intervals, the fuel injector is configured to inject fuel to the first arc ridge during the first main injection, the fuel injector is configured to inject fuel to the second arc ridge during the second main injection, and velocities of the fuel injected during the first main injection and the second main injection are not lower than a set velocity.

As a preferred technical solution of the method for controlling the combustion system, the piston moves upward in the cylinder and compresses gas in the cylinder chamber when the fuel injector performs the first main injection; and the piston moves downward in the cylinder when the fuel injector performs the second main injection.

As a preferred technical solution for the method for controlling the combustion system, when the fuel injector performs the first main injection, a fuel injection hole of the fuel injector faces toward a center of the first arc ridge, a distance between the fuel injection hole of the fuel injector and the center of the first arc ridge is $L_1$, a velocity of the fuel injected from the fuel injection hole of the fuel injector is $V_1$, an ignition delay period of the fuel injected during the first main injection fuel is $t_1$, and $t_1 = L_1/V_1$.

As a preferred technical solution of the method for controlling the combustion system, when the fuel injector performs the second main injection, the fuel injection hole of the fuel injector faces toward a center of the second arc ridge, a distance between the fuel injection hole of the fuel injector and the second arc ridge is $L_2$, a velocity of the fuel injected from the fuel injection hole of the fuel injector is $V_2$, an ignition delay period of the fuel injected during the second main injection is $t_2$, and $t_2 = L_2/V_2$.

As a preferred technical solution of the method for controlling the combustion system, a vertical distance between the center of the first arc ridge and the center of the second arc ridge is $H_1$, and a displacement between a position of the piston when the fuel injector performs the first main injection and a position of the piston when the fuel injector performs the second main injection is $H_2$, and $H_1$ is equal to $H_2$.

As a preferred technical solution of the method for controlling the combustion system, during a period between the first main injection and the second main injection performed by the fuel injector, the fuel injector continuously injects the fuel, and a velocity of the fuel injected by the fuel injector is lower than the set velocity.

In another aspect, a combustion system is provided according to the present application for the method for controlling the combustion system described above. The combustion system includes:
   a cylinder having a cylinder chamber;
   a piston, specifically, the piston is slidably arranged in the cylinder chamber of the cylinder, a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber;
   a fuel injector, configured to inject fuel into the combustion chamber; and
   a control system, configured to control a velocity of the fuel injected by the fuel injector, specifically, the control system is configured to control the fuel injector to inject the fuel to the first arc ridge at a velocity not lower than a set velocity, and control the fuel injector to inject the fuel to the second arc ridge at a velocity not lower than the set velocity.

As a preferred technical solution of the combustion system, the first arc ridge is closer to a center of the combustion chamber than to the second arc ridge, and the second arc ridge is closer to atop face of the combustion chamber than to the first arc ridge.

As a preferred technical solution of the combustion system, the first arc ridge is formed as a first arc in a vertical section of the combustion chamber, the second arc ridge is formed as a second arc in the vertical section of the combustion chamber, a radius of the first arc is $R_1$, a radius of the second arc is $R_2$, and $R_1$ is equal to $2R_2$ to $3R_2$.

In another aspect, an engine is provided according to the present application, and includes the combustion systems described above.

The beneficial effects of the present application are as follows:

The method for controlling the combustion system, the combustion system, and the engine are provided according to the present application. By the method for controlling the combustion system, the fuel injector performs the first main injection and the second main injection at intervals, the injector injects fuel to the first arc ridge during the first main injection, and the fuel can rebound and splash. The fuel injector injects fuel to the second arc ridge during the second main injection, and the fuel can rebound and splash. The velocities of the fuel injected during the first main injection and the second main injection are not lower than the set velocity. The combustion chamber with two arc ridges is adopted, and the fuel is injected to the two arc ridges through the fuel injector, which can ensure that the amount of the fuel shared by each of the arc ridges is reduced, avoid excessive accumulation of the fuel at a single arc ridge, and facilitate the improvement of the velocity field of a jet hitting a wall at the end of an oil beam by the arc ridge. Moreover, the two arc ridges guide and distribute the fuel of the two main injections, which is beneficial to strengthen the distribution of oil and gas in the cylinder, improves the utilization rate of air in the cylinder chamber, and improves the combustion efficiency, thereby improving the thermal efficiency of the engine.

BRIEF DESCRIPTION OF THE DRAWINGS

FIG. 1 is a structural schematic diagram of a combustion chamber of a piston and a fuel injector according to an embodiment of the present application.

IN THE FIGURE 1 bottom face; 2 main arc face; 3 first arc ridge; 4 first inclined face; 5 transition arc; 6 second arc ridge; 7 second inclined face; 8 throat transition face; 9 top face; and 10 fuel injector.

DETAILED DESCRIPTION OF EMBODIMENTS

The technical solutions of the present application are clearly and completely described below in conjunction with the accompanying drawings. Apparently, the described embodiments are part of the embodiments of the present application, not all of them. All other embodiments obtained based on the embodiments in the present application without creative efforts by those skilled in the art fall are within the protection scope of the present application.

In the description of the present application, it should be noted that, orientations or positional relationships indicated by terms such as "center", "up", "down", "left", "right", "vertical", "horizontal", "inside" and "outside" are based on the orientations or position relationships shown in the accompanying drawings, and are only for the convenience of describing the present application and simplifying the description, rather than indicating or implying that devices or elements referred to must have specific orientations, or must be constructed and operated in specific orientations, and thus should not be understood as limitations to the present application. In addition, terms "first" and "second" are only used for description, and should not be understood as indicating or implying relative importance. The terms "first position" and "second position" represent two different positions. Moreover, the first feature being "on", "above" and "over" the second feature includes that the first feature is directly above and obliquely above the second feature, or simply indicate that the first feature is horizontally higher than the second feature. The first feature being "below", "under" and "beneath" the second feature includes that the first feature is directly below and obliquely below the second feature, or simply indicate that the first feature is horizontally lower than the second feature.

In the description of the present application, it should be noted that, unless otherwise clearly specified and limited, terms "mount", "connect to" and "connect" should be understood in a broad sense, for example, may be a fixed connection, a detachable connection, or an integrated connection; may be a mechanical connection or an electric connection; may be a direct connection, or an indirect connection through an intermediary, and may be an internal connection of two elements. For those skilled in the art, the specific meanings of the terms in the present application can be understood based on specific situations.

The embodiments of the present application are described in detail below, examples of the embodiments are shown in the accompanying drawings, and same or similar reference signs represent same or similar elements or elements with same or similar functions throughout. The embodiments described below by referring to the accompanying drawings are exemplary, and are intended to explain the present application, and should not be understood as limitations to the present application.

As shown in FIG. 1, a combustion system is provided according to the embodiment. The combustion system includes a cylinder, a piston, a fuel injector 10 and a control system.

The cylinder has a cylinder chamber, the piston is slidably arranged in the cylinder chamber of the cylinder, and a combustion chamber communicated to the cylinder chamber is provided on top of the piston. The piston is driven by a crankshaft and so on, and can reciprocate in the cylinder.

A side wall of the combustion chamber is formed with a first arc ridge 3 and a second arc ridge 6 that are spaced apart from each other, and the first arc ridge 3 and the second arc ridge 6 protrude into the combustion chamber. Specifically, the structure of the combustion chamber is shown in FIG. 1, the combustion chamber is roughly a w-shaped combustion chamber. FIG. 1 only shows a half of the cross-section of the combustion chamber, which has a top face 9, a conical bottom face 1, and an annular side wall connecting the top face 9 and the bottom face 1. The side wall specifically includes a main arc face 2, a first arc ridge 3, a first inclined face 4, a transition arc 5, a second arc ridge 6, a second inclined face 7, and a throat transition face 8 arranged sequentially from bottom to top. The bottom face 1, the main arc face 2, the first arc ridge 3, the first inclined face 4, the transition arc 5, the second arc ridge 6, the second inclined face 7, the throat transition face 8, and top face 9 are tangentially connected in sequence. The main arc face 2 is concave inwardly, the first arc ridge 3 is closer to a center of the combustion chamber than the second arc ridge 6, and the second arc ridge 6 is closer to a top face of the combustion chamber than the first arc ridge 3. In the embodiment, the first arc ridge 3 is closer to the middle of the combustion chamber than the second arc ridge 6 along a depth direction of the combustion chamber. Preferably, the first arc ridge 3 is formed as a first arc 2 viewed in a vertical section of the combustion chamber, the second arc ridge 6 is formed as a second arc viewed in the vertical section of the combustion chamber, a radius of the first arc 2 is $R_1$, a radius of the second arc is $R_2$, and $R_1$ is equal to $2R_2$ to $3R_2$. In this way, a fuel-receiving area of the first arc ridge 3 is relatively large and centered, which facilitates the back splash of the fuel to various positions in the combustion chamber, so that the fuel can fully mix with air at the top, the middle and the bottom of the combustion chamber.

The fuel injector 10 is used to inject fuel into the combustion chamber, and the control system is used to control the velocity of the fuel injected by the fuel injector 10. The control system can control the fuel injector 10 to inject fuel to the first arc ridge 3 at a velocity not lower than a set velocity, and can control the fuel injector 10 to inject fuel to the second arc ridge 6 at a velocity not lower than the set velocity. The fuel injector 10 is supplied with the fuel through an oil pump, and the control system may include a controller and a regulating valve. The regulating valve is arranged in a connecting pipeline between the oil pump and the fuel injector 10, and the regulating valve is connected to the controller. The controller can adjust the flow rate of the passing fuel through the regulating valve, thereby the velocity of the fuel injected by the fuel injector 10 is controlled. It can be understood that, the fuel injector 10 is performing a main injection when the fuel injector 10 injects fuel at a velocity not lower than the set velocity, and the fuel injector 10 is performing pre-injection when the fuel is injected at a velocity lower than the set velocity. The combustion chamber is adopted with two arc ridges, and the fuel is injected to the two arc ridges through the fuel injector, which can ensure that the amount of the fuel shared by each of the arc ridges is reduced, avoid excessive accumulation of the fuel at a single arc ridge, facilitate the improvement of the velocity field of a jet hitting a wall at the end of the oil beam by the arc ridge, and is also conducive to the full mixing of fuel droplets and air.

A method for controlling a combustion system is also provided according to the embodiment, and the method for controlling a combustion system may be implemented through the combustion system described above. Specifically, the method for controlling a combustion system is implemented as follows: the fuel injector 10 performs a first main injection and a second main injection at intervals, the fuel injector 10 injects the fuel to the first arc ridge 3 during the first main injection, and the fuel can splash back. The fuel injector 10 injects the fuel to the second arc ridge 6 during the second main injection, and the fuel can splash back. Velocities of the fuel injected during the first main injection and the second main injection are not lower than the set velocity. The two arc ridges guide and distribute the fuel of the two main injections, which is beneficial to strengthen the distribution of oil and gas in the cylinder, improves the utilization rate of air in the cylinder chamber, and improves the combustion efficiency, thereby improving the thermal efficiency of the engine.

In other embodiments, three or more arc ridges of the combustion chamber may be provided. Taking three arc ridges as an example, the combustion chamber may also have a third arc ridge that is spaced apart from the first arc ridge 3 and the second arc ridge 6, and the third arc ridge protrudes outwardly towards the combustion chamber. The fuel injector 10 is controlled to perform three main injections during the movement of the piston, and oil beams of the three main injections fall onto the three arc ridges respectively, which further enhances the effect of oil-gas mixing.

Optionally, the piston moves upward in the cylinder and can compress gas in the cylinder chamber when the fuel injector 10 performs the first main injection. The piston moves downward in the cylinder when the fuel injector 10 performs the second main injection. In this way, the symmetry of the upward and downward movement of the piston can be fully used to refine the landing positions of the fuel and fully utilize the diversion effect and back splashing effect of the two arc ridges. Preferably, a vertical distance between the center of the first arc ridge 3 and the center of the second arc ridge 6 is $H_1$, and a displacement between a position of the piston when the fuel injector 10 performs the first main injection and a position of the piston when the fuel injector 10 performs the second main injection is $H_2$, and $H_1$ is equal to $H_2$. In this way, the orientation of a fuel injection hole of the fuel injector 10 is not required to be adjusted, and the fuel can be accurately injected to the two arc ridges during the up and down movement of the piston.

Optionally, during a period between the first main injection and the second main injection performed by the fuel injector 10, the fuel injector 10 continuously injects the fuel, and a velocity of the fuel injected by the fuel injector 10 is lower than the set velocity. In this way, the uniformity of oil-gas mixing in the cylinder chamber is further improved.

Optionally, as shown in FIG. 1, when the fuel injector 10 performs the first main injection, the fuel injection hole of the fuel injector 10 faces toward the center of the first arc ridge 3, and a distance between the fuel injection hole of the fuel injector 10 and the center of the first arc ridge 3 is $L_1$. A velocity of the fuel injected from the fuel injection hole of the fuel injector 10 is $V_1$, and an ignition delay period of the fuel injected during the first main injection is $t_1$, and $t_1 = L_1/V_1$. In this way, time $t_i$ after the fuel is injected from the fuel injector 10, the fuel contacts the first arc ridge 3, and then the fuel enters a rapid combustion period after splashing, which does not affect the subsequent splashing effect of the fuel on the first arc ridge 3. The ignition delay period of the fuel may be regulated by temperature, oil quality, and so on.

Optionally, when the fuel injector 10 performs the second main injection, the fuel injection hole of the fuel injector 10 faces towards the center of the second arc ridge 6, and a distance between the fuel injection hole of the fuel injector 10 and the second arc ridge 6 is $L_2$. A velocity of the fuel injected from the fuel injection hole of the fuel injector 10 is $V_2$, an ignition delay period of the fuel injected during the second main injection is $t_2$, and $t_2 = L_2/V_2$. In this way, time $t_2$ after the fuel is injected from the fuel injector 10, the fuel contacts the second arc ridge 6, and then the fuel enters a rapid combustion period after splashing, which does not affect the subsequent splashing effect of the fuel on the second arc ridge 6.

An engine is also provided according to the embodiment, and includes the combustion system described above.

Apparently, the embodiments of the present application are only examples for clearly illustrating the present application, and are not intended to limit the implementations of the present application. For those skilled in the art, other variations or changes can be made based on the above description. It is not necessary and impossible to exhaustively list all implementations herein. Any modifications, equivalent replacements and improvements made within the spirit and the principles of the present application shall be included within the protection scope of the present application.

What is claimed is:

1. A method for controlling a combustion system, wherein the combustion system comprises a piston, a cylinder and a fuel injector, the piston is slidably arranged in a cylinder chamber of the cylinder, a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber; the method for controlling a combustion system comprising:

the fuel injector performing a first main injection and a second main injection at intervals, in which the fuel injector injects fuel to the first arc ridge during the first main injection, the fuel injector injects fuel to the second arc ridge during the second main injection, and velocities of the fuel injected during the first main injection and the second main injection are not lower than a set velocity;

wherein the piston moves upward in the cylinder and compresses gas in the cylinder chamber when the fuel injector performs the first main injection; and the piston moves downward in the cylinder when the fuel injector performs the second main injection; and wherein when the fuel injector performs the first main injection, a fuel injection hole of the fuel injector faces toward a center of the first arc ridge, a distance between the fuel injection hole of the fuel injector and the center of the first arc ridge is $L_1$, a velocity of the fuel injected from the fuel injection hole of the fuel injector is $V_1$, an ignition delay period of the fuel injected during the first main injection is $t_1$, and $t_1=L_1/V_1$.

2. The method for controlling a combustion system according to claim 1, wherein when the fuel injector performs the second main injection, a fuel injection hole of the fuel injector faces toward a center of the second arc ridge, a distance between the fuel injection hole of the fuel injector and the second arc ridge is $L_2$, a velocity of the fuel injected from the fuel injection hole of the fuel injector is $V_2$, an ignition delay period of the fuel injected during the second main injection is $t_2$, and $t_2=L_2/V_2$.

3. A combustion system for implementing the method for controlling a combustion system according to claim 2, comprising:

a cylinder having a cylinder chamber;
a piston, wherein the piston is slidably arranged in the cylinder chamber of the cylinder, and a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber;
a fuel injector, configured to inject fuel into the combustion chamber; and
a control system, configured to control a velocity of the fuel injected by the fuel injector, wherein the control system is configured to control the fuel injector to inject the fuel to the first arc ridge at a velocity not lower than a set velocity, and control the fuel injector to inject the fuel to the second arc ridge at a velocity not lower than the set velocity.

4. The method for controlling a combustion system according to claim 1, wherein a vertical distance between a center of the first arc ridge and a center of the second arc ridge is $H_1$, and a displacement between a position of the piston when the fuel injector performs the first main injection and a position of the piston when the fuel injector performs the second main injection is $H_2$, and $H_1$ is equal to $H_2$.

5. A combustion system for implementing the method for controlling a combustion system according to claim 4, comprising:

a cylinder having a cylinder chamber;
a piston, wherein the piston is slidably arranged in the cylinder chamber of the cylinder, and a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber;
a fuel injector, configured to inject fuel into the combustion chamber; and
a control system, configured to control a velocity of the fuel injected by the fuel injector, wherein the control system is configured to control the fuel injector to inject the fuel to the first arc ridge at a velocity not lower than a set velocity, and control the fuel injector to inject the fuel to the second arc ridge at a velocity not lower than the set velocity.

6. The method for controlling a combustion system according to claim 1, wherein during a period between the first main injection and the second main injection performed by the fuel injector, the fuel injector continuously injects the fuel, and a velocity of the fuel injected by the fuel injector is lower than the set velocity.

7. A combustion system for implementing the method for controlling a combustion system according to claim 6, comprising:

a cylinder having a cylinder chamber;
a piston, wherein the piston is slidably arranged in the cylinder chamber of the cylinder, and a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber;
a fuel injector, configured to inject fuel into the combustion chamber; and
a control system, configured to control a velocity of the fuel injected by the fuel injector, wherein the control system is configured to control the fuel injector to inject the fuel to the first arc ridge at a velocity not lower than a set velocity, and control the fuel injector to inject the fuel to the second arc ridge at a velocity not lower than the set velocity.

8. A combustion system for implementing the method for controlling a combustion system according to claim 1, comprising:

a cylinder having a cylinder chamber;
a piston, wherein the piston is slidably arranged in the cylinder chamber of the cylinder, and a combustion chamber communicated to the cylinder chamber is provided on top of the piston, a side wall of the combustion chamber is formed with a first arc ridge and a second arc ridge that are spaced apart from each other, and the first arc ridge and the second arc ridge protrude into the combustion chamber;
a fuel injector, configured to inject fuel into the combustion chamber; and
a control system, configured to control a velocity of the fuel injected by the fuel injector, wherein the control system is configured to control the fuel injector to inject the fuel to the first arc ridge at a velocity not lower than a set velocity, and control the fuel injector to inject the fuel to the second arc ridge at a velocity not lower than the set velocity.

9. The combustion system according to claim 8, wherein the first arc ridge is closer to a center of the combustion chamber than the second arc ridge, and the second arc ridge is closer to a top face of the combustion chamber than the first arc ridge.

10. The combustion system according to claim 8, wherein the first arc ridge is formed as a first arc in a vertical section of the combustion chamber, the second arc ridge is formed as a second arc in the vertical section of the combustion chamber, a radius of the first arc is $R_1$, a radius of the second arc is $R_2$, and $R_1$ is equal to $2R_2$ to $3R_2$.

11. An engine comprising the combustion system according to claim 8.

* * * * *